US006986936B2

(12) United States Patent
Müller et al.

(10) Patent No.: US 6,986,936 B2
(45) **Date of Patent: *Jan. 17, 2006**

(54) LAYERED COMPOSITE MATERIALS WITH A DECORATIVE LAYER MADE FROM A CHROMED METAL

(75) Inventors: Klaus Müller, Sulzbach (DE); Klaus Klemm, Oberelsbach (DE)

(73) Assignee: Basell Polydlefine GmbH, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/811,432

(22) Filed: Mar. 20, 2001

(65) Prior Publication Data

US 2001/0033919 A1 Oct. 25, 2001

(30) Foreign Application Priority Data

Mar. 23, 2000 (DE) ................................ 100 14 046

(51) Int. Cl.
*B32B 3/00* (2006.01)
*B32B 7/14* (2006.01)
*B32B 27/00* (2006.01)
*B32B 27/12* (2006.01)

(52) U.S. Cl. ................ 428/209; 428/292.1; 428/195.1; 428/201; 428/516; 428/523

(58) Field of Classification Search ................ 428/209, 428/212, 85, 195.1, 201, 203, 211, 480, 500, 428/515, 516, 523, 311.11, 156, 542.2; 156/245; 442/327, 394, 150
See application file for complete search history.

(56) References Cited

U.S. PATENT DOCUMENTS 3,668,034 A * 6/1972 Nicholas et al. ............ 156/245
5,597,466 A 1/1997 Bauer et al. ................ 204/529
5,965,232 A * 10/1999 Vinod ......................... 428/85

FOREIGN PATENT DOCUMENTS

| | | |
|---|---|---|
| CA | 2136746 | 12/1993 |
| DE | 2 021 810 | 11/1971 |
| DE | 2849980 | 5/1979 |
| DE | 4218369 | 12/1993 |
| DE | 197 22 339 | 12/1998 |
| DE | 198 58 173 | 6/2000 |
| EP | 108710 | 5/1984 |
| EP | 0 571 826 | 12/1993 |
| GB | 1 525 978 | 9/1978 |
| GB | 2008492 | 6/1979 |
| HU | 203300 B | 1/1990 |

* cited by examiner

*Primary Examiner*—Rena Dye
*Assistant Examiner*—Lawrence Ferguson
(74) *Attorney, Agent, or Firm*—Novak Druce & Quigg; Daniel S. Kim

(57) ABSTRACT

Layered composite materials which comprises a substrate made from a thermoplastic polymer, and comprise an intermediate layer arranged thereupon and a decorative layer applied to the intermediate layer, where the decorative layer is composed of a chromed metal. A heat-cured layer may moreover be applied to the decorative layer. Layered composite materials of this type are suitable, inter alia, as reflecting or insulating parts of household devices or of moldings in the electrical, construction or automotive industry.

3 Claims, 5 Drawing Sheets

LAYERED COMPOSITE MATERIALS WITH A DECORATIVE LAYER MADE FROM A CHROMED METAL

The present invention relates to a layered composite material which comprises a substrate made from a thermoplastic polymer, and comprises an intermediate layer arranged thereupon and a decorative layer applied to the intermediate layer, where the decorative layer is composed of a chromed metal. The present invention further relates to a process for producing this layered composite material, and also to its use as a reflecting or insulating part of a household device, of a piece of furniture or of a molding in the electrical, construction or automotive industry or in the health sector.

The layered composite materials known hitherto are used in particular in the furniture industry and in the household equipment industry, and essentially consist of a substrate layer made from wood or from wood fibers or from individual sheets of paper press-molded with addition of resin, to which decorative layers, and also other heat-cured layers, known as overlays, are applied using heat and pressure. The decorative layers used here frequently have a wood grain, or a metallic or a marble pattern. In many cases the decorative layers are used together with the heat-cured layers applied thereto, in the form of laminates.

However, a disadvantage of layered composite materials of this type is that they are to some extent susceptible to moisture penetrating into the core layer from the edges, since both wood and wood fibers, and also individual sheets of paper, tend to swell when exposed to moisture. In addition, layered composite materials of this type are relatively difficult to shape.

For a wide variety of industrial applications, for example in the automotive or electrical industry, there is a need for surface materials which have, on the one hand, high compressive strength and, on the other hand, comparatively high heat resistance, and which moreover can readily be produced with decorative effects.

Surface materials used for a long time in furniture production have two or more layers, including a substrate layer, a decorative layer and a heat-cured layer lying thereupon. These layers, with the aid of other bonded layers, for example made from paper or from adhesive films, give a decorative layered composite material. However, a layered composite material of this type is very complicated to produce, frequently has a high formaldehyde content, and has disadvantageous swelling behavior.

Another disadvantage of the layered composite materials described hitherto is that the layers applied are comparatively thin and are frequently susceptible to damage from mechanical stress, and have no reinforcing effect on other components once they have been bonded to these.

DE-A 1 97 22 339 discloses a layered composite material which comprises a substrate layer made from polypropylene, a decorative layer arranged thereupon and a heat-cured layer applied to the decorative layer. DE-A 19 858 173 moreover describes a layered composite material made from a substrate layer of various other thermoplastic polymers, for example certain styrene copolymers or polyoxymethylene or, respectively, polybutylene terephthalate, and also a decorative layer applied thereto and a heat-cured layer lying thereupon. Examples of features of layered composite materials of this type comprising a substrate layer made from thermoplastic polymers, in comparison with conventional layered composite materials with substrate layers made from wood, wood fibers or paper, are: high heat and moisture resistance, better mechanical strength and easier processing. However, a degree of stiffness and brittleness in the individual polymeric layers means that the layered composite materials known from DE-A 19 722 339 and DE-A 19 858 173 still have certain disadvantages in processing and shaping, in particular in three-dimensional shaping to give components for the automotive sector, the household sector or the electrical sector. In addition, layered composite materials of this type are in some cases found to give difficulties in downstream operation, such as surface-coating or the attachment of other functional parts.

In some industrial applications, such as household devices or moldings in the electrical, construction or automotive industry, it is moreover important for layered composite materials of this type to act as insulators or else reflectors for radiant heat or light, and to be able to withstand mechanical and thermal stresses, to have good aging resistance and bondability in relation to other materials, and moreover to be easy to recycle and permit ready integration of functional parts.

It is an object of the present invention, therefore, to overcome the disadvantages described and to provide an improved layered composite material which, inter alia, is mechanically and thermally stable and resistant to aging, can readily be combined with other functional parts and, furthermore, is either an insulator or else a reflector for radiant heat or light.

We have found that this object is achieved by the development of an improved layered composite material which comprises a substrate made from a thermoplastic polymer, and comprises an intermediate layer arranged thereupon and a decorative layer applied to the intermediate layer, where the decorative layer is composed of a chromed metal.

In one modification, the novel layered composite material may also comprise a heat-cured layer on the decorative layer. In the novel layered composite material it is also possible for both sides of the substrate made from the thermoplastic polymer to have an intermediate layer, a decorative layer arranged thereupon, and also, if desired, a heat-cured layer applied to the decorative layer, giving a sandwich-type structure with the substrate in the middle.

Based on the total weight of the substrate, the material of the substrate may comprise from 1 to 60% by weight, preferably from 5 to 50% by weight, particularly preferably from 10 to 40% by weight, of reinforcing fillers, such as barium sulfate, magnesium hydroxide, talc with an average particle size of from 0.1 to 10 $\mu$m, measured to DIN 66 115, wood, flax, chalk, glass fibers, coated glass fibers, long or short glass fibers, glass beads or mixtures of these. The material of the substrate may also comprise the usual additives, such as light stabilizers, UV stabilizers, heat stabilizers, pigments, carbon blacks, lubricants, flame retardants, blowing agents and the like, in the amounts which are usual and required.

Examples of thermoplastic polymers which form the substrate are polypropylene, polyethylene, polyvinyl chloride, polysulfones, polyether ketones, polyesters, polycycloolefins, polyacrylates and polymethacrylates, polyamides, polycarbonate, polyurethanes, polyacetals, e.g. polyoxymethylene, polybutylene terephthalates and polystyrenes. Both homopolymers and copolymers of these thermoplastic polymers may be used here. Besides the reinforcing fillers, the substrate layer is preferably composed of polypropylene, polyoxymethylene, polybutylene terephthalate or polystyrene, in particular of copolymers of styrene with subordinate proportions of one or more comonomers, e.g. butadiene, $\alpha$-methylstyrene, acrylonitrile, vinylcarbazole, or esters of acrylic, methacrylic or itaconic acid. The substrate of the novel layered composite material may also comprise recycled materials made from these thermoplastic polymers.

For the purposes of the present invention, polyoxymethylenes are homo- or copolymers of aldehydes, for example of formaldehyde, and of cyclic acetals. These have repeating carbon-oxygen bonds in the molecule and have melt flow rates (MFR), to ISO 1133, of from 5 to 40 g/10 min., in particular from 5 to 30 g/10 min., at 230° C. under a load of 2.16 kg.

The polybutylene terephthalate preferably used is a relatively high-molecular-weight esterification product of terephthalic acid with butylene glycol and has a melt flow rate (MFR), to ISO 1133, of from 5 to 50 g/10 min., in particular from 5 to 30 g/10 min., at 230° C. under a load of 2.16 kg.

Copolymers of styrene are in particular copolymers having up to 45% by weight, preferably up to 20% by weight, of copolymerized acrylonitrile. These copolymers made from styrene and acrylonitrile (SAN) have a melt flow rate (MFR), to ISO 1133, of from 1 to 25 g/10 min., in particular from 4 to 20 g/10 min., at 230° C. under a load of 2.16 kg.

Preference is also given to the use of copolymers of styrene comprising up to 35% by weight, in particular up to 20% by weight, of copolymerized acrylonitrile and up to 35% by weight, in particular up to 30% by weight, of copolymerized butadiene. The melt flow rate of these copolymers made from styrene, acrylonitrile and butadiene (ABS), to ISO 1133, is from 1 to 40 g/10 min., in particular from 2 to 30 g/10 min., at 230° C. under a load of 2.16 kg.

Other materials used for the substrate are in particular polyolefins, such as polyethylene or polypropylene, preferably the latter. For the purposes of the present invention, polypropylene is a homo- or copolymer of propylene. Copolymers of propylene contain subordinate amounts of monomers copolymerizable with propylene, for example $C_2$–$C_8$ 1-alkenes, such as ethylene, 1-butene, 1-pentene or 1-hexene. It is also possible to use two or more different comonomers.

Examples of particularly suitable substrate materials are homopolymers of propylene or copolymers of propylene with up to 50% by weight of other copolymerized 1-alkenes having up to 8 carbon atoms. The copolymers of propylene here are random copolymers or block or impact copolymers. If the copolymers of propylene have a random structure they generally contain up to 15% by weight, preferably up to 6% by weight, of other 1-alkenes having up to 8 carbon atoms, in particular ethylene, 1-butene or a mixture of ethylene and 1-butene.

Block or impact copolymers of propylene are polymers for which the first stage is to prepare a propylene homopolymer or a random copolymer of propylene with up to 15% by weight, preferably up to 6% by weight, of other 1-alkenes having up to 8 carbon atoms and then the second stage is to polymerize onto this a propylene-ethylene copolymer having an ethylene content of from 15 to 80% by weight, where the propylene-ethylene copolymer may also contain other $C_4$–$C_8$ 1-alkenes. The amount of the propylene-ethylene copolymer polymerized on here is generally such that in the final product the proportion of the copolymer produced in the second stage is from 3 to 60% by weight.

The polymerization to prepare polypropylene may use a Ziegler-Natta catalyst system. The catalyst systems used here are in particular those which have cocatalysts in the form of organic aluminum compounds b) and electron-donor compounds c), as well as a titanium-containing solid component a).

It is, however, also possible to use catalyst systems based on metallocene compounds and, respectively, based on metal complexes active in polymerization.

Specifically, usual Ziegler-Natta catalyst systems comprise a titanium-containing solid component, inter alia halides or alcoholates of tri- or tetravalent titanium, and also a halogen-containing magnesium compound, inorganic oxides, e.g. silica gel, as substrates, and also electron-donor compounds. These are in particular carboxylic acid derivatives, or else ketones, ethers, alcohols or organosilicon compounds.

The titanium-containing solid component may be prepared by methods known per se. Examples of these are described, inter alia, in EP-A 45 975, EP-A 45 977, EP-A 86 473, EP-A 171 200, GB-A 2 111 066, U.S. Pat. Nos. 4,857,613 and 5,288,824. The process known from DE-A 195 29 240 is preferably used.

Suitable aluminum compounds b), besides trialkylaluminum compounds, are those compounds in which one alkyl group has been replaced by an alkoxy group or by a halogen atom, for example by chlorine or bromine. The alkyl groups may be identical or differ from one another and may be linear or branched. Preference is given to the use of trialkylaluminum compounds having alkyl groups each of which has from 1 to 8 carbon atoms, for example trimethylaluminum, triethylaluminum, triisobutylaluminum, trioctylaluminum or methyldiethylaluminum, or mixtures of these.

Other cocatalysts used, besides the aluminum compound b), are generally electron-donor compounds c), such as mono- or polybasic carboxylic acids, carboxylic anhydrides or carboxylic esters, or else ketones, ethers, alcohols or lactones, or else organophosphorus or organosilicon compounds. The electron-donor compounds c) may be identical with or different from the electron-donor compounds used to prepare the titanium-containing solid component a).

Instead of Ziegler-Natta catalyst systems it is also possible to prepare polypropylene by using metallocene compounds and, respectively, metal complexes active in polymerization.

For the purposes of the present invention, metallocenes are complex compounds made from metals of transition groups of the Periodic Table with organic ligands, giving effective catalyst systems when combined with metallocenium-ion-forming compounds. When used to prepare polypropylene, the metallocene complexes in the catalyst system are generally in supported form. Substrates frequently used are inorganic oxides, but it is also possible to use organic substrates in the form of polymers, such as polyolefins. Preference is given to the inorganic oxides described above, which are also used to prepare the titanium-containing solid component a).

The central atoms in the metallocenes usually used are titanium, zirconium or hafnium, preferably zirconium. The central atom generally has bonding via a $\pi$ bond to at least one, generally substituted, cyclopentadienyl group, and also to other substituents. The other substituents may be halogens, hydrogen or organic radicals, preferably fluorine, chlorine, bromine or iodine or $C_1$–$C_{10}$-alkyl. The cyclopentadienyl group may also be a constituent of an appropriate heteroaromatic system.

Preferred metallocenes contain central atoms which have bonding via two identical or different $\pi$ bonds to two substituted cyclopentadienyl groups. Particularly preferred metallocenes are those in which there are substituents of the cyclopentadienyl groups bonded to both cyclopentadienyl groups. Particular preference is given to complexes whose substituted or unsubstituted cyclopentadienyl groups additionally have substitution on two adjacent carbon atoms by cyclic groups, where the cyclic groups may also have been integrated within a heteroaromatic system.

Other preferred metallocenes are those which contain only one substituted or unsubstituted cyclopentadienyl group which, however, has substitution by at least one radical also bonded to the central atom.

Examples of suitable metallocene compounds are
- ethylenebis(indenyl)zirconium dichloride,
- ethylenebis(tetrahydroindenyl)zirconium dichloride,
- diphenylmethylene-9-fluorenylcyclopentadienylzirconium dichloride,
- dimethylsilanediylbis(3-tert-butyl-5-methylcyclopentadienyl)zirconium dichloride,
- dimethylsilanediyl-(2-methyl-4-azapentalene)-(2-methyl-4-(4'-methylphenyl)indenyl)zirconium dichloride,
- dimethylsilanediyl-(2-methyl-4-thiapentalene)-(2-ethyl-4-(4'-tert-butylphenyl)indenyl)zirconium dichloride,
- ethanediyl-(2-ethyl-4-azapentalene)-(2-ethyl-4-(4'-tert-butylphenyl)indenyl)zirconium dichloride,
- dimethylsilanediylbis(2-methyl-4-azapentalene)zirconium dichloride,
- dimethylsilanediylbis(2-methyl-4-thiapentalene)zirconium dichloride,
- dimethylsilanediylbis(2-methylindenyl)zirconium dichloride,
- dimethylsilanediylbis(2-methylbenzindenyl)zirconium dichloride,
- dimethylsilanediylbis(2-methyl-4-phenylindenyl)zirconium dichloride,
- dimethylsilanediylbis(2-methyl-4-naphthylindenyl)zirconium dichloride,
- dimethylsilanediylbis(2-methyl-4-isopropylindenyl)zirconium dichloride and
- dimethylsilanediylbis(2-methyl-4,6-diisopropylindenyl)zirconium dichloride, and also the corresponding dimethylzirconium compounds.

The metallocene compounds are either known or can be obtained by known methods. It is also possible to use mixtures of metallocene compounds of this type for catalysis, or to use the metallocene complexes described in EP-A 416 815.

The metallocene catalyst systems also comprise metallocenium-ion-forming compounds. Those suitable are strong, neutral Lewis acids, ionic compounds with Lewis-acid cations or ionic compounds with Brönsted acids as cation. Examples of these are tris(pentafluorophenyl)borane, tetrakis(pentafluorophenyl)borate and salts of N,N-dimethylanilinium. Other suitable metallocenium-ion-forming compounds are open-chain or cyclic aluminoxane compounds. These are usually prepared by reacting trialkylaluminum compounds with water and are generally mixtures of linear and also cyclic chain molecules of various lengths.

The metallocene catalyst systems may moreover comprise organometallic compounds of the metals of the 1st, 2nd or 3rd main group of the Periodic Table, for example n-butyllithium, n-butyl-n-octylmagnesium or triisobutylaluminum, triethylaluminum or trimethylaluminum.

The polypropylenes used for the substrate layer are prepared by polymerization in at least one reaction zone, or else frequently in two or even more reaction zones arranged in series (a reactor cascade), in the gas phase, in suspension or in the liquid phase (bulk). The usual reactors for polymerizing $C_2$–$C_8$ 1-alkenes may be used. Examples of suitable reactors are continuous stirred-tank reactors, loop reactors and fluidized-bed reactors. The size of the reactors is not significant here. It depends on the output which is to be achieved in the individual reaction zone(s).

Use is in particular made of fluidized-bed reactors or else horizontally or vertically agitated powder-bed reactors. The reaction bed is generally composed of the polymer made from $C_2$–$C_8$ 1-alkenes which is polymerized in the respective reactor.

The polypropylenes used as substrate layers are prepared by polymerization under conventional reaction conditions at from 40 to 120° C., in particular from 50 to 100° C., and at pressures of from 10 to 100 bar, in particular from 20 to 50 bar.

The polypropylenes used as substrates generally have a melt flow rate (MFR), to ISO 1133, of from 0.1 to 200 g/10 min., in particular from 0.2 to 100 g/10 min., at 230° C. under a load of 2.16 kg.

It is also possible to use blends, i.e. mixtures of different thermoplastic polymers, as substrate in the novel layered composite material, for example blends made from a copolymer of styrene with acrylonitrile and from a copolymer made from butadiene and acrylonitrile.

The novel layered composite material also comprises an intermediate layer applied to the substrate. The intermediate layer and the substrate are preferably composed of the same thermoplastic, and this particularly improves the adhesion between substrate and intermediate layer. The intermediate layer is in particular a thin film or a thin web of thickness from 0.001 to 1.0 mm, in particular from 0.005 to 0.3 mm. Possible materials for the intermediate layer are the thermoplastics described above for the substrates, i.e. in particular polypropylene and polyethylene, polymers of styrene, polyoxymethylene or polybutylene terephthalate.

Other materials preferred as intermediate layer are resin-saturated webs and resin-saturated thermoplastic films. The resins used for this are in particular acrylate resins, phenolic resins, urea resins or melamine resins. The degree of resinification here may be up to 300%, meaning that practically the entire surface of the intermediate layer has more than one coating of resin. The degree of resinification is preferably from 50 to 150%, in particular from 80 to 120%. The weight of the intermediate layer per $m^2$ is from 15 to 150 g, in particular from 30 to 60 g.

The novel layered composite material also has a chromed metal as decorative layer. The location of this chromed metal is on top of the intermediate layer, and it has a thickness of from 0.1 to 0.5 mm, in particular from 0.1 to 2.0 mm and particularly preferably from 0.1 to 1.0 mm. The chromed metal used here may be either a layer of chromium or else a layer of another metal, such as stainless steel, iron, copper, nickel, tin or zinc, or appropriate alloys of these metals, this layer then having been covered with another, chromium, layer. It is also possible for the chromed metal used to be a layer of a suitable thermoplastic polymer which has been covered with a further, chromium, layer. Examples of thermoplastic polymers with good suitability for this purpose are polyolefins, e.g. polypropylene or polyethylene, polyamides, polycarbonates, and also copolymers of styrene, such as SAN or ABS.

The structure of the decorative layer, made from a chromed metal, means that it has both reflecting and insulating properties. The decorative layer should have as smooth a surface as possible in order to achieve good reflection of radiation. So that the novel layered composite materials have good insulating properties it is advisable to select a very high thickness for the decorative layer and also to apply a very thick heat-cured layer (overlay) to the same. The overlay here, which is generally composed of a thermoset, acts as a good insulator. The laminate structure also prevents thermal and mechanical damage to the thermoplastic substrate, and the novel layered composite materials therefore have no tendency to soften, even at relatively high temperatures.

The novel layered composite materials may also comprise a heat-cured layer, applied to the decorative layer.

The heat-cured layer (overlay) arranged on the decorative layer is preferably composed of a thermoset, for example of a paper saturated with acrylic resin, with phenolic resin, with melamine resin or with urea resin and crosslinked by exposure to pressure or heat during the production of the layered composite material. The weight of the heat-cured layer (overlay) is usually from 10 to 300 g/m$^2$, in particular from 15 to 150 g/m$^2$ and particularly preferably from 20 to 70 g/m$^2$.

The heat-cured layer (overlay) may also have been arranged together with the decorative layer as a ready-to-use laminate on the intermediate layer, either on one or else on both sides. Ready-to-use laminates of this type are known per se and are available, inter alia, from Melaplast in Schweinfurt, Germany.

The total thickness of the novel layered composite material is from 0.5 to 100 mm, preferably from 1.0 to 20 mm, in particular from 1.0 to 10 mm, at least 80% of which, preferably at least 90% of which, is made up by the substrate.

The production of the novel layered composite materials may follow a process which comprises the materials for the intermediate layer, the decorative layer and, if used, the heat-cured layer, each in the form of thin sheets, and then providing these at from 150 to 300° C., in particular from 160 to 280° C., with the material for the substrate. The intermediate layer, the decorative layer and the heat-cured layer (overlay) may also preferably be used here together in the form of a ready-to-use laminate, which is also a sheet.

It is also possible to begin by bonding the intermediate layer, the decorative layer and, if used, the heat-cured layer to one another by dipping into an adhesive bath or by using thin adhesive strips in a press, preferably in a double belt press, and then to apply this composite to the substrate. It can also be advisable here to begin by shaping the composite made from intermediate layer, decorative layer and, if used, heat-cured layer in two dimensions by thermoforming or direct forming, for example in an injection mold, and then combining this with the thermoplastic which is to form the substrate, by in-mold coating, extrusion or hot-press molding. If the substrate and the intermediate layer here are composed of identical thermoplastics, the adhesion found between the two layers is very strong.

Another way of modifying the process for producing the novel layered composite material is for the layered composite material to be shaped in three dimensions after heat-treatment at from 150 to 300° C., in particular from 150 to 250° C., particularly preferably from 160 to 200° C. This method can produce, inter alia, moldings for the electrical, construction or automotive industry.

Another way of producing the novel layered composite material is to use conventional plastics industry processing methods for bonding to the intermediate layer, to the decorative layer, to the heat-cured layer, if used, and to the substrate. Examples of these conventional processing methods are injection molding, extrusion and hot-press molding of the individual layers.

In injection molding, the individual layers, that is to say the substrate, the intermediate layer, the decorative layer and, if used, the heat-cured layer (or the latter layers together in the form of a ready-to-use laminate) are either directly preformed via a thermoforming process and then in-mold coated with one another in an injection mold, or else are directly formed with one another in the injection mold, and in-mold coated. This procedure may take place either on one side or else on both sides, and in the latter case the arrangement has the intermediate layer, the decorative layer and if used, the heat-cured layer on both sides of the substrate. This injection-molding procedure usually takes place at from 150 to 300° C., in particular from 180 to 280° C., preferably from 190 to 270° C., and at pressures of from 50 to 100 N/cm$^2$, in particular from 60 to 80 N/cm$^2$. The temperatures and, pressures arising in the injection mold achieve not only very good bonding of the thermoplastic intermediate layer to the thermoplastic substrate, but also further curing of the novel layered composite material. Compared with layered composite materials known hitherto, this is very flexible and can be formed successfully in downstream processing steps.

In the extrusion process, the intermediate layer, the decorative layer and, if used, the heat-cured layer of the novel layered composite material are fed onto one or both sides of the thermoplastic of the substrate by way of temperature-controlled calander rolls or embossing rolls (the process being known as lamination) and thus bonded to one another. Temperatures of from 150 to 300° C., in particular from 160 to 250° C., preferably from 170 to 220° C. are usually set here with pressures of from 40 to 200 N/cm$^2$, in particular from 50 to 100 N/cm$^2$. This gives very good adhesion of the individual sheets to one another. The resultant layered composite material also has good surface properties.

One version of the extrusion process is that known as profile extrusion, in which the individual layers of the novel layered composite material, in particular the intermediate layer, are shaped via a calibrating unit, so that this layer can then be fed directly onto the actual profile, i.e. the substrate made from thermoplastic.

It ia also possible to obtain the novel layered composite material by hot-press molding of the individual layers. These may be shaped either in advance by an upstream thermoforming process or else directly within the press. This is done by feeding pellets of thermoplastic directly onto a laminated composite made from the intermediate layer, the decorative layer, and, if used, the heat-cured layer, and press-molding this combination at from 150 to 300° C., in particular from 160 to 250° C., preferably from 170 to 230° C., and at a pressure of from 50 to 120 N/cm$^2$, in particular from 80 to 100 N/cm$^2$ with press times of from 0.5 to 10 minutes, in particular from 1 to 5 minutes and particularly preferably from 1 to 3 minutes.

The novel layered composite materials have, inter alia, good mechanical properties due to the good adhesion between the individual layers. They can readily be shaped in two or three dimensions, and also have high resistance to high temperatures and to chemicals, and are aging-resistant. The novel layered composite materials may readily be combined with other functional elements and moreover have good insulating and reflecting properties with respect to radiant heat and/or light. A particular further advantage of these materials is that their laminate structure gives them fracture-resistance, making them particularly advantageous when compared with conventional reflectors, such as mirrors.

The novel layered composite materials are suitable, inter alia, as reflecting or insulating parts in household devices, in pieces of furniture or in the electrical, construction or automotive industry or in the health sector.

The process, likewise novel, for producing the layered composite materials is simple to carry out and it is particularly worthy of note that conventional production and assembly processes are used.

The Examples and embodiments below are intended to describe the invention in further detail. In the Examples, the following tests were carried out on specimens:

gloss was determined visually.

impact strength was determined by a drop impact test from 1.75 m.

flexural modulus of elasticity was measured at +23° C., +60° C. and +90° C. to ISO 178.

Charpy impact resistance was determined at +23° C. and at −20° C. to ISO 179/1 eU, and heat distortion temperature (HDT/A) was measured to ISO 75/1+2.

EXAMPLE 1 AND COMPARATIVE EXAMPLE A

A novel layered composite material (Example 1) was compared for reflection properties with a conventional mirror (Comparative Example A).

The layered composite material was composed of a layer made from a propylene homopolymer as substrate with a melt flow rate (MFR) to ISO 1133 of 15 g/10 min. at 230° C. and 2.16 kg, an intermediate layer of a synthetic-polymer nonwoven made from the same propylene homopolymer, a decorative layer made from a chromed stainless steel of thickness 0.2 mm and an overlay made from melamine resin of thickness 0.1 mm. The layered composite material had a total thickness of 1.4 mm, 90% of which was made up by the substrate.

The novel layered composite material and the conventional mirror were compared for gloss, reflectance and fracture behavior. The results of the measurements are given in Table I below.

TABLE I

| Property | Example 1 | Comparative Example A |
|---|---|---|
| Gloss | good | very good |
| Reflectance | very good | very good |
| Impact strength | no damage detectable | severe damage |

From the results in Table I it can be seen, inter alia, that the novel layered composite material has very good fracture behavior while still having good gloss.

EXAMPLE 2 AND COMPARATIVE EXAMPLE B

The mechanical and thermal stability of a novel layered composite material (Example 2) were compared with those of a conventional test specimen made from polypropylene (Comparative Example B).

The layered composite material of Example 2 was composed of the same substrate material, the same intermediate layer, the same decorative layer and the same overlay as in Example 1, but the thickness of the decorative layer was now 0.2 mm and that of the overlay was 0.1 mm. The layered composite material had an total thickness of 1.4 mm, of which 90% was made up by the substrate.

The test specimen of Comparative Example B was composed of a propylene homopolymer with a melt flow rate (MFR) to ISO 1133 of 15 g/10 min. at 230° C. and 2.16 kg.

Both the novel layered composite material and the test specimen of Comparative Example B had the same dimensions. They were both tested for flexural modulus of elasticity, Charpy impact resistance and heat distortion temperature (HDT/A). The results of the measurements are given in Table II below.

TABLE II

| Property | Example 2 | Comparative Example B |
|---|---|---|
| Flexural modulus of elasticity [N/mm$^2$] | | |
| at +23° C. | 8921 | 2000 |
| at +60° C. | 7224 | 1000 |
| at +90° C. | 6293 | 800 |
| Charpy impact resistance [kJ/m$^2$] | | |
| at +23° C. | 25.6 | 60 |
| at −20° C. | 18.9 | 16 |
| Heat distortion temperature [° C.] (HDT/A) | 160 | 58 |

The results in Table II show, inter alia, that the novel layered composite material has, inter alia, high flexural modulus of elasticity, high Charpy impact resistance, and also good values for heat distortion temperature (HDT/A).

Some examples of embodiments of the novel layered composite materials are shown diagrammatically in the drawings below (FIGS. 1 to 5) and are now described in more detail.

Figure 1:
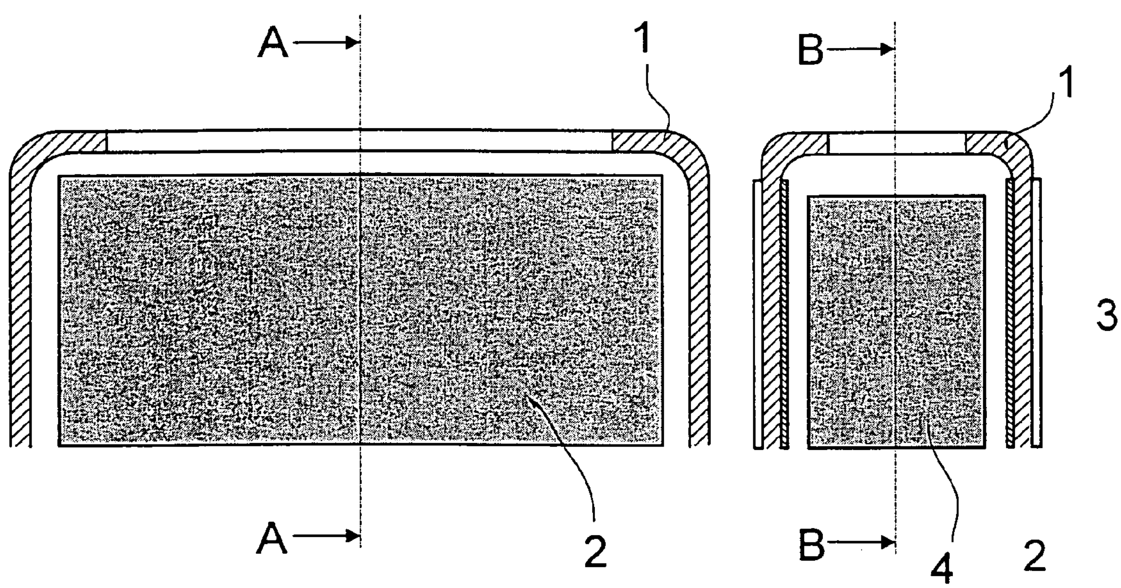
FIG. 1 shows a toaster cover made from the novel layered composite material.
Figure 2:
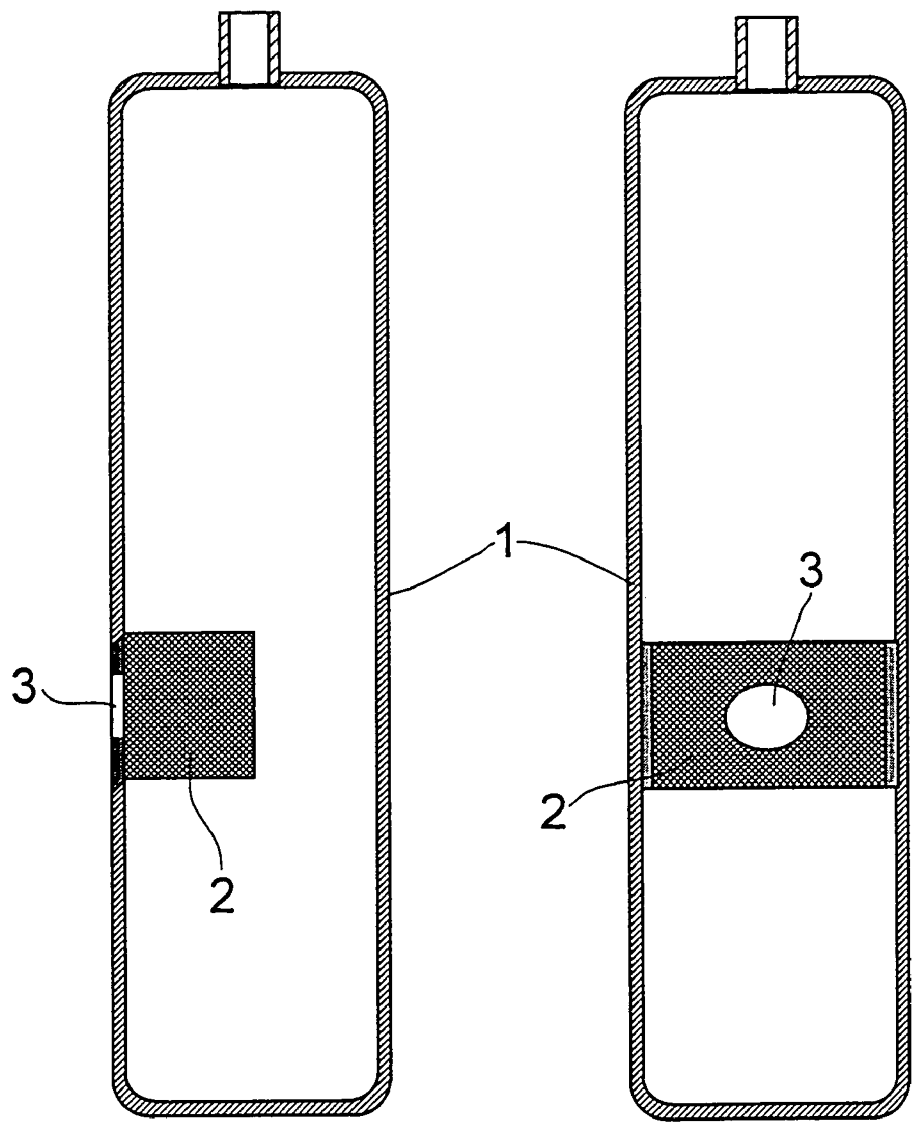
FIG. 2 shows the "lightproof" casing of an electric toothbrush.

DESCRIPTION OF FIG. 1:

The toaster cover substrate (1), made from a propylene homopolymer with a melt flow rate (MFR) to ISO 1133 of 15 g/min. at 230° C. and 2.16 kg has, arranged on the inner side of its lateral surfaces, a laminate (2) made from an intermediate layer of a nonwoven, composed of a polypropylene prepared using metallocene catalysts, and from a chromed metal as decorative layer, the laminate serving as an insulating layer which keeps the heat evolved by the actual toaster apparatus (4) away from the toaster cover substrate (1). For reasons associated with distortion, an appropriate further laminate (3), the constituents of whose structure are the same as those for the laminate (2), is also applied facing away from the laminate (2). This makes it possible to reduce the gap between the toaster apparatus (4) and the toaster cover substrate (1), permitting new toaster designs.

DESCRIPTION OF FIG. 2:

The casing (1) of an electric toothbrush made from a propylene homopolymer with a melt flow rate (MFR) to ISO 1133 of 50 g/min. at 230° C. and 2.16 kg comprises an opening for a light-emitting diode (3). So that the light-emitting diode is not visible through the entire casing, around the aperture in the casing a laminate layer (2) is applied which renders the casing (1) around the light-emitting diode (3) lightproof. The laminate layer is composed of a decorative layer made from chromed metal and of an intermediate layer made from a nonwoven composed of a polypropylene prepared using metallocene catalysts. The casing (1) is in this case the substrate for the laminate (2). The size and thickness of the laminate are selected to be appropriate for the light output of the light-emitting diode.

DESCRIPTION OF FIG. 3:

The substrate for the mirror (1) is composed of a propylene copolymer having 20% by weight of ethylene incorporated into the polymer and with a melt flow index of 15 g/10 min. to ISO 1133 at 230° C. and 2.16 kg. A cover (4) has been molded onto the substrate (1) by way of a film hinge (5), and the cover can be closed onto the reflecting metal surface (2) of the laminate to prevent damage thereto. To prevent unintended opening of the cover (4), this is fastened to the substrate (1) by means of a snap-action hook (6). On the reverse side of the substrate a balancing layer (3) has been applied, of the same dimensions as the laminate with the reflecting metal surface (2), and made from the same laminate. The laminate layer here is composed of a melamine resin as overlay, a decorative layer made from chromed metal and of an intermediate layer made from a nonwoven which is composed of a polypropylene prepared using metallocene catalysts.

Figure 3:
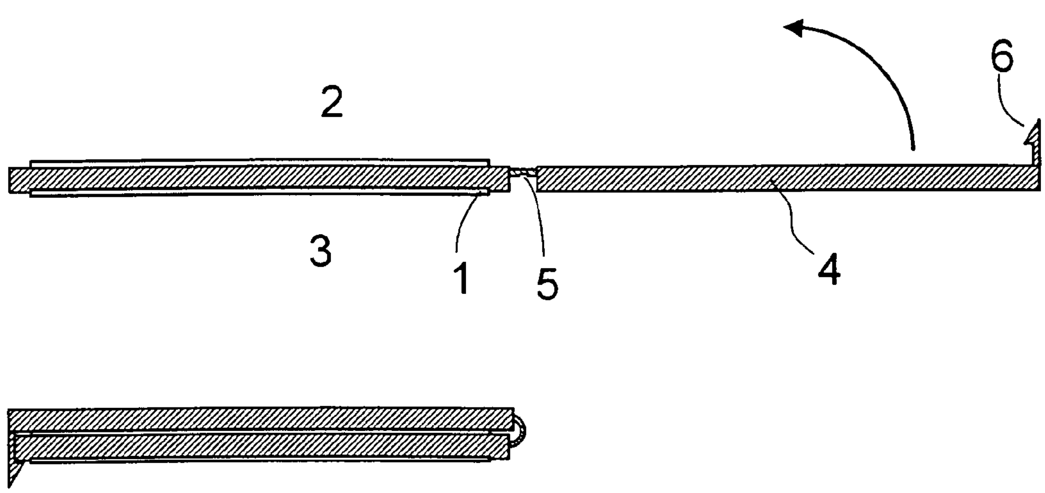
FIG. 3 shows the structure of a "fracture-resistant" mirror.
Figure 4:
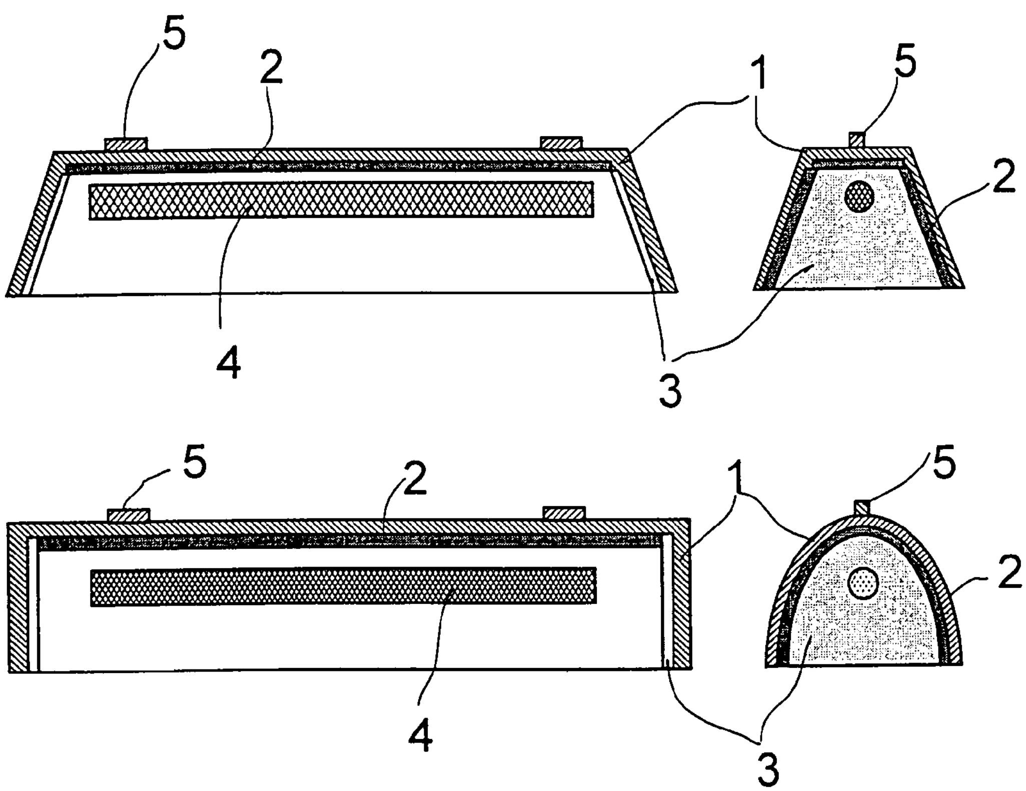
FIG. 4 shows the structure of a housing/reflector for lamps/sun lamps.
Figure 5:
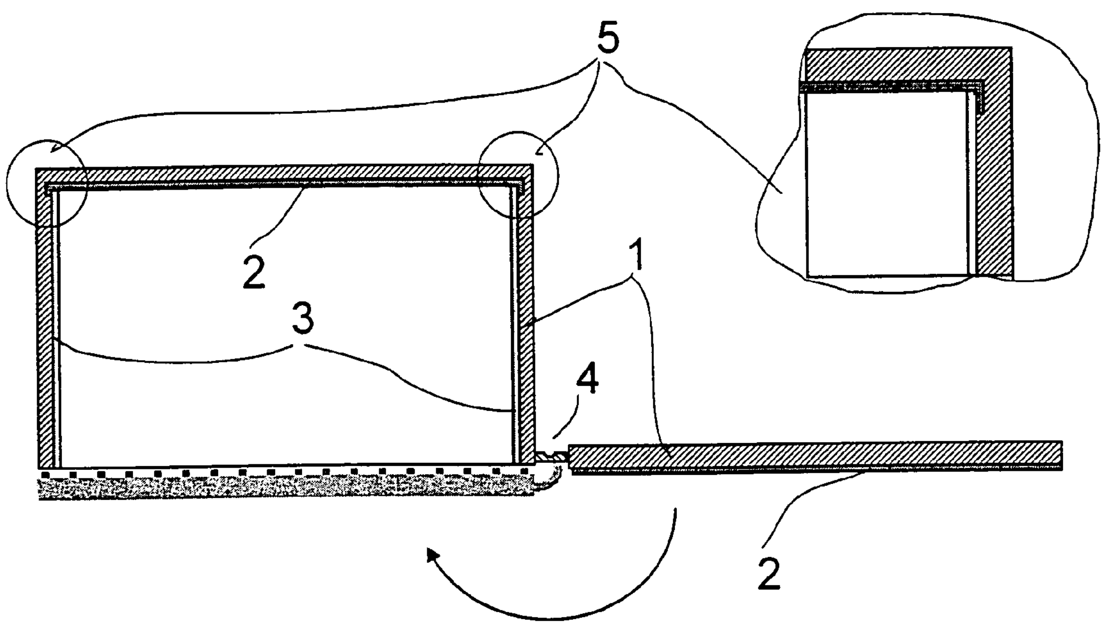
FIG. 5 shows the structure of an electromagnetically screened casing.

DESCRIPTION OF FIG. 4:

The housing for the lamp is the substrate made from a propylene homopolymer with 20% by weight talc reinforcement and with a melt flow index of 15 g/10 min. to ISO 1133 at 230° C. and 2.16 kg, on which has been located the laminate with the reflecting metal surface (2, 3). In this case, the face sides are executed using separate sections of laminate (3). The laminate used here is as described for FIG. 3. The lamp (4) has been arranged in the housing (1) between the two reflecting laminate surfaces (2, 3) so that its light can be reflected by the laminate surfaces (2) and (3). Molded onto the substrate (1) there are also fastenings (5) for assembling the lamp (4).

DESCRIPTION OF FIG. 5:

The substrate (1) for the insulating laminate layers (2, 3) is composed of a propylene homopolymer prepared with the aid of metallocene catalysts and having a melt flow rate (MFR) to ISO 1133 of 50 g/min. at 230° C. and 2.16 kg. The laminate used here is as described for FIG. 3. The substrate (1) forms both the casing floor and the casing cover, the two parts being connected to one another via a film hinge (4). To achieve the best possible screening action, the final shape given to the individual laminates for the floor (2) and the sides (3) makes the corner regions of the laminates overlap.

We claim:

1. A layered composite material which comprises a substrate made from a thermoplastic propylene homopolymer, an intermediate layer composed of a thermoplastic polypropylene prepared in the presence of a metallocene polymerization catalyst whereby said intermediate layer is designed as a non-woven filamentary layer, a decorative layer applied to the intermediate layer, where the decorative layer is composed of a chromed metal and a heat-cured layer which sits on top of the decorative layer.

2. A layered composite material as claimed in claim 1, where the intermediate layer and substrate are composed of the same thermoplastic.

3. A layered composite material as claimed in claim 1, the total thickness of which is from 0.5 to 100 mm, at least 80% of which is made up by the substrate.

* * * * *